US005510399A

United States Patent [19]
Sauer

[11] Patent Number: 5,510,399
[45] Date of Patent: Apr. 23, 1996

[54] AQUEOUS, HIGH-SOLIDS SYNTHETIC RUBBER EMULSION AND ITS PREPARATION

[75] Inventor: Thomas Sauer, Haltern, Germany

[73] Assignee: Huels Aktiengesellschaft, Marl, Germany

[21] Appl. No.: 344,583

[22] Filed: Nov. 18, 1994

[30] Foreign Application Priority Data

Dec. 30, 1993 [DE] Germany .......................... 43 44 992.1

[51] Int. Cl.$^6$ ..................................................... C08J 3/02
[52] U.S. Cl. ........................... 523/335; 524/521; 528/487
[58] Field of Search ........................... 523/335; 528/487; 524/521

[56] References Cited

U.S. PATENT DOCUMENTS

| | | | |
|---|---|---|---|
| 3,330,795 | 7/1967 | Schlueter | 260/29.7 |
| 4,150,004 | 4/1979 | Schlueter | 260/23.7 A |
| 5,294,659 | 3/1994 | Kidder | 524/458 |
| 5,336,720 | 8/1994 | Richards et al. | 575/78 |

FOREIGN PATENT DOCUMENTS

| | | |
|---|---|---|
| 0433710 | 6/1991 | European Pat. Off. . |
| 0517539 | 12/1992 | European Pat. Off. . |
| 2235966 | 1/1975 | France . |
| 2645082 | 4/1978 | Germany . |
| 137718 | 9/1979 | Germany . |

*Primary Examiner*—Edward J. Cain
*Attorney, Agent, or Firm*—Oblon, Spivak, McClelland, Maier & Neustadt

[57] ABSTRACT

A process for the chemical agglomeration of a finely dispersed, aqueous synthetic rubber emulsion which involves:

contacting the finely dispersed, aqueous synthetic rubber emulsion with an agglomeration agent of a water-soluble or water-dispersible copolymer, wherein the copolymer contains 10 to 90% by weight of one or more hydrophobic, water-insoluble, olefinically unsaturated monomers; and 90 to 10% by weight of one or more hydrophilic, water-soluble and salt-forming, olefinically unsaturated monomers;

at a temperature and concentration sufficient to cause agglomeration of the finely dispersed, aqueous synthetic rubber emulsion, and the use of the thus obtained high solids synthetic rubber emulsion in the production of foamed shaped articles and foamed latices is provided.

13 Claims, No Drawings

AQUEOUS, HIGH-SOLIDS SYNTHETIC RUBBER EMULSION AND ITS PREPARATION

FIELD OF THE INVENTION

The present invention relates to a process for the agglomeration of finely dispersed synthetic rubber emulsions in the preparation of high solids synthetic rubber emulsions, and their use in the production of latex foams.

DISCUSSION OF THE BACKGROUND

Aqueous synthetic rubber emulsions having a high level of solids (herein referred to as "high-solids synthetic rubber emulsions") are very important industrially for the production of shaped foam articles and foamed carpet backings. It is known that the latex particles in such latices must be relatively large and their size distributions must be relatively broad in order to obtain a high solids content while maintaining a low viscosity. For example, the preparation of a high-solids aqueous styrene/butadiene emulsion having a solids content of up to 70% by weight directly by conventional emulsion polymerization is not possible since finely dispersed emulsions are obtained in the conventional industrial emulsion polymerization processes. Due to the small particle size, the viscosity of the emulsion increases very sharply at such high solids levels.

Although the preparation of coarse-particled emulsions is known (see DE 21 65 410), such coarse-particled emulsions are not of industrial interest in the case of styrene/butadiene emulsions, because as the particle size increases and hence the particle concentration decreases, the rate of polymerization decreases considerably at the same phase ratio. This causes the process to become uneconomical due to the extremely long reaction times thus required.

Finely dispersed synthetic rubber emulsions are therefore usually prepared with a relatively low solids content and converted by agglomeration into coarse-particled synthetic rubber emulsions having a broad distribution of particle sizes. High-solids synthetic rubber emulsions are then obtained by subsequent removal of water.

Conventional processes for agglomeration are pressure agglomeration and agglomeration by freezing. In these methods, the application of high pressure or partial freezing of the synthetic rubber emulsions causes partial colloidal instability which leads to agglomeration of the latex particles. As a result, the viscosity of the synthetic rubber emulsion is substantially reduced at high solids levels. Both processes are technically very demanding and therefore contribute to high operating costs.

Another process is chemical agglomeration, in which an agglomerating agent, which spontaneously initiates a controlled agglomeration process, is added to the finely dispersed synthetic rubber emulsion. Such a process is described in DE 26 45 082 and U.S. Pat. No. 3 330 795. Oxidized polyethylene oxides have been traditionally used as agglomerating agents. This conventional process provides the agglomeration of finely dispersed synthetic rubber emulsions to give latices having a very broad distribution of the particle sizes and a number average particle diameter ranging from 0.2 to 2 μm. Such synthetic rubber emulsions can be concentrated to solids contents of 65 to 70% by weight at a Brookfield viscosity level of 1,000 to 3,000 mPa.s, which is acceptable for industrial use.

However, it is desired to obtain agglomerating agents which can be used to provide high solids synthetic rubber emulsions with improved costs of production, improved shelf life and which do not exhibit separation of coarse particles.

SUMMARY OF THE INVENTION

Accordingly, one object is to provide a process for agglomeration of finely dispersed synthetic rubber emulsions by chemical agglomeration with an agglomerating agent which provides cost savings in the agglomeration process and improved agglomeration.

A further object of the present invention is to provide a high solids synthetic rubber emulsion prepared by agglomeration with a chemical agglomeration agent which exhibits improved shelf life and avoids separation of coarse particles (also known as "creaming").

A further object of the present invention is to provide a latex foam or foamed latex article prepared from the high solids synthetic rubber emulsion of the present invention, which is suitable for the production of such items as foamed carpet backings and latex mattresses.

These and other objects of the present invention have been satisfied by the discovery of a process for the chemical agglomeration of a finely dispersed, aqueous synthetic rubber emulsion comprising:

contacting the finely dispersed, aqueous synthetic rubber emulsion with an agglomeration agent comprising a water-soluble or water-dispersible copolymer comprising 10 to 90% by weight of one or more hydrophobic, water-insoluble, olefinically unsaturated monomers; and 90 to 10% by weight of one or more hydrophilic, water-soluble and salt-forming, olefinically unsaturated monomers;

at a temperature and concentration sufficient to cause agglomeration of the finely dispersed, aqueous synthetic rubber emulsion and the use of the resulting agglomerated emulsions in the production of high solids synthetic rubber emulsions useful for the preparation of foamed latex and foamed shaped articles.

DETAILED DESCRIPTION OF THE PREFERRED EMBODIMENTS

The present invention relates to a process for the chemical agglomeration of a finely dispersed, aqueous synthetic rubber emulsion comprising:

contacting the finely dispersed, aqueous synthetic rubber emulsion with an agglomeration agent comprising a water-soluble or water-dispersible copolymer comprising 10 to 90% by weight of one or more hydrophobic, water-insoluble, olefinically unsaturated monomers; and 90 to 10% by weight of one or more hydrophilic, water-soluble and salt-forming, olefinically unsaturated monomers;

at a temperature and concentration sufficient to cause agglomeration of the finely dispersed, aqueous synthetic rubber emulsion.

The preparation of finely dispersed, aqueous synthetic rubber emulsions by the emulsion polymerization process is known in the art. Such a process is described, for example, in DE 26 45 082, which process is hereby incorporated by reference. Preferred synthetic rubber emulsions for use in the agglomeration process of the present invention are styrene/butadiene copolymer emulsions.

These finely dispersed synthetic rubber emulsions are used in the process of the present invention with an agglomeration agent which comprises a water-soluble or water-dispersible copolymer to provide high solids synthetic rubber emulsions.

The water-soluble or water-dispersible copolymers which comprise the agglomeration agent of the present invention are prepared from at least one hydrophobic, water-insoluble monomer and at least one hydrophilic, water-soluble and salt-forming monomer. Within the context of the present invention, "water-insoluble" means that the solubility of the monomers in water at 25° C. is less than 3 percent by weight. Within the context of the present invention "water-soluble" means that the solubility of these monomers or the metal or ammonium salts thereof in water at 25° C. is at least 10 percent by weight.

The hydrophobic water-insoluble monomers of the present invention include linear or branched $C_1$–$C_{18}$ alkyl esters of acrylic or methacrylic acid, vinyl esters having 1 to 12 carbon atoms in the acid component, vinyl aromatic monomers, such as styrene, α-methylstyrene or vinyltoluene, and olefinically unsaturated dienes, such as butadiene and isoprene. Preferred among these hydrophobic monomers are linear or branched $C_1$–$C_8$ alkyl esters of acrylic and methacrylic acid and styrene, with methyl methacrylate, butyl acrylate and styrene being most preferred.

Hydrophilic, water-soluble and salt-forming monomers which may be used include olefinically unsaturated sulphonic or carboxylic acids or the metal or ammonium salts thereof. Sulpho-containing derivatives of (meth)acrylic acid, such as sulphoalkyl (meth)acrylates having 1 to 8 carbon atoms in the alkyl chain, vinyl-aromatic sulphonic acids, such as styrene sulphonic acid, vinyl sulphonic acid and (meth)allylsulphonic acid or the metal or ammonium salts thereof are examples of monomers which are suitable for this purpose. Further examples of suitable monomers include monobasic and polybasic olefinically unsaturated acids, such as acrylic acid, methacrylic acid, maleic acid, fumaric acid or itaconic acid, or the metal or ammonium salts thereof. Preferred among these hydrophilic monomers are sulphoethyl and sulphopropyl (meth)acrylate, styrene sulphonic acid and (meth)acrylic acid or the metal or ammonium salts thereof. When the metal salts of the hydrophilic monomers are used, the sodium and potassium salts are preferred.

The copolymers of the present invention contain 10 to 90% by weight of one or more hydrophobic monomers and 90 to 10% by weight of one or more hydrophilic monomers, preferably 30 to 70% by weight of hydrophobic monomers and 70 to 30% by weight of hydrophilic monomers.

The hydrophobic monomer may be used singly or in mixtures of two or more hydrophobic monomers in preparing the copolymers. Likewise, the hydrophobic monomers may be used singly or in a mixture of two or more.

The agglomeration agent of the present invention can be prepared by conventional free radical polymerization processes. The free radical polymerization is preferably performed in water as the solvent or dispersant, with the hydrophilic and hydrophobic monomers being added semi-continuously. The free radical initiator, preferably a water-soluble peroxodisulphate (such as sodium peroxodisulphate or ammonium peroxodisulphate), may be added in its entirety at the beginning of polymerization or be metered in semi-continuously during the polymerization. In the polymerization, it is preferable to use no additional solvents or dispersants other than the water mentioned above.

The agglomeration agents of the present invention have a number average molecular weight of between 1,000 and 100,000 g/mol, preferably between 5,000 and 20,000 g/mol. The desired molecular weight can be obtained using the conventional method of adding a water-soluble molecular weight regulator.

For the agglomeration of the finely dispersed synthetic rubber emulsion, the finely dispersed emulsion is heated to a temperature of 20° to 80° C., preferably 40° to 60° C., while stirring. The agglomeration agent of the present invention is then added in the form of a dilute aqueous solution or dispersion, having an agglomeration agent concentration of from 1 to 20% by weight, preferably from 2 to 10% by weight. The amount of agglomeration agent added to the synthetic rubber emulsion is between 0.1 and 5% by weight, based on the solids content of the aqueous synthetic rubber emulsion, with the addition of 0.5 to 1.5% by weight of agglomeration agent being most preferred.

The agglomeration agent can be added to the synthetic rubber emulsion as a single charge, in several portions during the agglomeration process or semi-continuously in the feed. It is preferred to add the agglomeration agent as a single charge just prior to or at the beginning of the agglomeration process.

In a further embodiment, additional agglomeration auxiliaries can be added simultaneously with the agglomeration agent of the present invention. In particular, an aqueous solution of a salt can be added simultaneously and in the same manner as the agglomeration agent of the present invention. Preferred salts include the halides of the alkali and alkaline-earth metals, with potassium chloride being most preferred. The salt is added as an aqueous solution having a salt concentration of from 5 to 50% by weight, preferably from 10 to 20% by weight. The added amount of salt is 0.1 to 5% by weight, preferably 0.5 to 1.5% by weight, based on the solids level of the synthetic rubber emulsion.

Upon addition of the agglomeration agent of the present invention, (and the salt, if desired) the agglomeration begins spontaneously and leads to a measurable decrease in the surface tension. This decrease in surface tension provides a convenient method for monitoring the agglomeration process. While the finely dispersed synthetic rubber emulsion has a relatively high surface tension of 60 to 70 mN/m, this decreases to values of 40 to 55 mN/m during the agglomeration. The agglomeration process is deemed complete when the surface tension has reached a constant final value.

Other monitoring methods can also be used to follow the process such as monitoring the increase in the mean diameter of the latex particles by conventional particle size measurement methods. Alternatively the decrease in the latex viscosity during the agglomeration can be monitored.

Further conventional assistants, such as emulsifiers, dispersants or other auxiliaries, may be added if desired, either during or after the agglomeration. However, the success of the agglomeration does not depend on the addition of these further assistants.

The synthetic rubber emulsion obtained as a result of the agglomeration process of the present invention is then concentrated by removal of water by conventional methods. After water removal, a latex can be obtained having a solids content of 60 to 73% by weight, preferably 66 to 72% by weight, and having a Brookfield viscosity of 1,000 to 5,000 mPa.s, preferably 1,500 to 3,000 mPa.s. The latex obtained is free of finely divided coagulum and coarse-particled precipitates, and has a number average particle diameter range of from 2 to 200 μm.

When compared to the process for chemical agglomeration described in U.S. Pat. No. 3,330,795 (providing a mean particle diameter after agglomeration between 0.2 and 2

μm), the present invention provides solids contents 2 to 3% by weight higher at equivalent latex viscosities. This gives an additional cost benefit in the production of latex foams since a smaller amount of water has to be evaporated. The synthetic rubber emulsions prepared according to the present invention have a long shelf life and do not undergo the process of creaming.

The high-solids synthetic rubber emulsions according to the present invention can be used in the conventional production of latex foams by mechanical expansion of the latices with air or other gaseous blowing agents and subsequent vulcanization at elevated temperatures. They are equally suitable for other conventional processes for latex foam production. The latex foams thus produced can be used in particular for the production of foamed carpet backings and for the production of latex mattresses and other shaped foam articles.

Other features of the present invention will become apparent in the course of the following description of specific examples, which are provided herein merely for illustrative purposes and are not intended to be limiting of the invention unless otherwise indicated.

EXAMPLES

Examples 1 to 6

Agglomerating agents according to the present invention were prepared in a glass flask having a reflux condenser, a stirrer and an internal thermometer as follows: 100 g of water were initially introduced and heated to 75° C. The hydrophilic monomer was metered in continuously over the course of 2 hours as a solution in 250 g of water, and simultaneously with the hydrophobic monomer. 1 g of sodium peroxodisulphate initiator in 50 g of water was then metered in over a 3 hour period. After the end of the initiator feed, polymerization was continued for a further 2 hours. The amounts of monomers used in each case are shown in the table below.

| Example | Hydrophilic monomer (g) | Hydrophobic monomer (g) | Appearance |
| --- | --- | --- | --- |
| 1 | NaSS/30 | MMA/70 | Solution |
| 2 | NaSS/50 | MMA/50 | Solution |
| 2 | NaSS/70 | MMA/30 | Solution |
| 4 | SPM/50 | MMA/50 | Solution |
| 5 | NaSS/50 | S/50 | Emulsion |
| 6 | NaSS/10 AA/20 | MMA/70 | Turbid solution |

MMA: Methyl methacrylate
BA: n-butyl acrylate
S: Styrene
NaSS: Sodium styrenesulphonate
SPM: Potassium sulphopropylmethacrylate
NaMAS: Sodium methallyl sulphonate
AA: Acrylic acid

Examples 7 and 8

In an alternative process, the agglomerating agents according to the invention were prepared in a glass flask having a reflux condenser, a stirrer and an internal thermometer as follows: 75 g of methyl ethyl ketone were initially introduced and heated to 75° C. The hydrophilic monomer was metered in continuously over the course of 2 hours, and simultaneously with the hydrophobic monomer. 3 g of azoisobutyronitrile initiator in 25 g of methyl ethyl ketone were metered in over a 3 hour period. After the end of the initiator feed, the polymerization was continued for a further 4 hours. A molar equivalent of a base, based on the hydrophilic monomer, in an excess of water, was added to the batch, and the methyl ethyl ketone was completely distilled off. The amounts of monomers used in each case are shown in the table below.

| Example | Hydrophilic monomer (g) | Hydrophobic monomer (g) | Base | Appearance |
| --- | --- | --- | --- | --- |
| 7 | MA/50 | MMA/50 | TEOHA | Solution |
| 8 | MA/30 | MMA/70 | NaOH | Solution |

MAA: Methyl methacrylate
MA: Maleic anhydride
AA: Acrylic acid
NAOH: Sodium hydroxide solution
TEOHA: Triethanolamine Preparation Example A: Preparation of the starting finely divided synthetic rubber emulsion A finely divided synthetic rubber emulsion having a styrene content of 25 and a butadiene content of 75 percent by weight was prepared according to Example 1 of DE 26 45 082, but without carrying out an agglomeration step with oxidized polyethylene glycol. The latex had a solids content of 38.8% by weight, a viscosity of 204 mPa.s, a surface tension of 71.3 mN/m and a volume average particle diameter of 84 nm.

Examples 9 to 12

The following examples show the effect of the amounts of agglomeration agent and electrolyte on the agglomeration of synthetic rubber emulsions.

In each of Examples 9–12, the emulsion according to Preparation Example A was heated to 50° C. in a flask while stirring. A 10% strength potassium chloride solution and a 1.75% strength solution of the agglomerating agent according to Example 1 were then added. The course of the agglomeration was monitored by measuring the surface tension. The amounts used (in % by weight, based on the solids content of the emulsion), the surface tensions after the end of the experiment and the drop in surface tension during agglomeration are shown in the table below. The agglomeration was considered successful if the surface tension decreased by at least 15 units during the course of 90 minutes.

| Example | Agglomerating agent (% by weight) | KCl (% by weight) | Surface tension (mN/m) | Surface Tension Drop (mN/m) |
| --- | --- | --- | --- | --- |
| 9 | 0.6 | 0.0 | 67.9 | 3.4 |
| 10 | 0.6 | 0.8 | 46.3 | 25.0 |
| 11 | 0.1 | 0.8 | 68.9 | 2.4 |
| 12 | 1.0 | 0.8 | 44.3 | 27.0 |

Examples 13 to 15

The following examples illustrate the use of various agglomeration agents of the present invention.

The agglomeration was carried out by the process described above in Examples 9 to 12. The type and amounts (in % by weight, based on the solids content of the emulsion) of agglomerating agents used, the surface tensions after the end of the experiment and the drop in surface tension during agglomeration are shown in the table below.

| Example | Agglomerating agent (according to Example No./ % by weight) | KCl (% by weight) | Surface tension (mN/m) | Surface Tension Drop (mN/m) |
|---|---|---|---|---|
| 13 | 1/0.6 | 0.8 | 46.3 | 25.0 |
| 14 | 2/0.6 | 0.8 | 56.2 | 15.1 |
| 15 | 4/0.6 | 0.8 | 54.6 | 16.7 |

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A process for the chemical agglomeration of a finely dispersed, aqueous synthetic rubber emulsion comprising:

contacting the finely dispersed, aqueous synthetic rubber emulsion with an agglomeration agent comprising a water-soluble or water-dispersible copolymer comprising 10 to 90% by weight of one or more hydrophobic, water-insoluble, olefinically unsaturated monomers; and 90 to 10% by weight of one or more hydrophilic, water-soluble and salt-forming, olefinically unsaturated monomers selected from the group consisting of olefinically unsaturated sulphonic acid compounds and salts thereof;

at a temperature and concentration sufficient to cause agglomeration of the finely dispersed, aqueous synthetic rubber emulsion.

2. The process according to claim 1, wherein the water-soluble or water-dispersible copolymer comprises:

30 to 70% by weight of one or more hydrophobic, water-insoluble, olefinically unsaturated monomers; and 70 to 30% by weight of one or more hydrophilic, water-soluble and salt-forming, olefinically unsaturated monomers.

3. The process according to claim 1, wherein said water-soluble or water-dispersible copolymer has a number average molecular weight of 5,000 to 20,000 g/mol.

4. The process according to claim 1, wherein said hydrophobic, water-insoluble monomer is at least one member selected from the group consisting of alkyl(meth)acrylates having 1 to 8 carbon atoms in the alkyl chain and styrene.

5. The process according to claim 1, wherein said agglomeration agent is added in as an aqueous solution or dispersion having a concentration of agglomeration agent of 0.5 to 1.5% by weight, based on a content of solids of the finely divided synthetic rubber emulsion.

6. The process according to claim 5, wherein an aqueous salt solution containing 0.5 to 1.5% by weight of a salt, based on a content of solids of the finely divided synthetic rubber emulsion, is added simultaneously with said agglomerating agent.

7. The process according to claim 1, wherein the finely divided synthetic rubber emulsion is a styrene/butadiene emulsion.

8. An aqueous, high-solids synthetic rubber emulsion having a solids content of 66 to 72% by weight, which is obtained by a process comprising:

agglomerating a finely divided synthetic rubber emulsion by contacting said finely divided synthetic rubber emulsion with an agglomeration agent comprising a water-soluble or water-dispersible copolymer comprising 10 to 90% by weight of one or more hydrophobic, water-insoluble, olefinically unsaturated monomers and 90 to 10% by weight of one or more hydrophilic, water-soluble and salt-forming, olefinically unsaturated monomers selected from the group consisting of olefinically unsaturated sulphonic acid compounds and salts thereof, at a temperature and concentration sufficient to obtain an agglomerated emulsion; and concentrating the agglomerated emulsion to a solids level of from 66 to 72% by weight.

9. The aqueous, high-solids synthetic rubber emulsion according to claim 8, wherein the aqueous high-solids synthetic rubber emulsion has a mean particle diameter of from 2 to 200 μm and a very broad particle size distribution.

10. The aqueous, high-solids synthetic rubber emulsion according to claim 8, wherein said finely divided synthetic rubber emulsion is a styrene/butadiene emulsion.

11. A method for preparing latex foams comprising:

agglomerating a finely divided synthetic rubber emulsion by contacting said finely divided synthetic rubber emulsion with an agglomeration agent comprising a water-soluble or water-dispersible copolymer comprising 10 to 90% by weight of one or more hydrophobic, water-insoluble, olefinically unsaturated monomers and 90 to 10% by weight of one or more hydrophilic, water-soluble and salt-forming, olefinically unsaturated monomers selected from the group consisting of olefinically unsaturated sulphonic acid compounds and salts thereof, at a temperature and concentration sufficient to obtain an agglomerated emulsion;

concentrating the agglomerated emulsion to a solids level of from 66 to 72% by weight to obtain a high solids synthetic rubber emulsion; and foaming said high solids synthetic rubber emulsion.

12. The method according to claim 11, wherein said foaming step is performed by mechanically expanding said high solids synthetic rubber emulsion with a gaseous blowing agent to obtain an expanded latex and vulcanizing said expanded latex.

13. A shaped foamed article prepared by agglomerating a finely divided synthetic rubber emulsion by contacting said finely divided synthetic rubber emulsion with an agglomeration agent comprising a water-soluble or water-dispersible copolymer comprising 10 to 90% by weight of one or more hydrophobic, water-insoluble, olefinically unsaturated monomers and 90 to 10% by weight of one or more hydrophilic, water-soluble and salt-forming, olefinically unsaturated monomers selected from the group consisting of olefinically unsaturated sulphonic acid compounds and salts thereof, at a temperature and concentration sufficient to obtain an agglomerated emulsion;

concentrating the agglomerated emulsion to a solids level of from 66 to 72% by weight to obtain a high solids synthetic rubber emulsion;

mechanically expanding said high solids synthetic rubber emulsion with a gaseous blowing agent to obtain an expanded latex; and vulcanizing said expanded latex.

* * * * *